United States Patent
Crowe et al.

(10) Patent No.: US 6,928,068 B1
(45) Date of Patent: Aug. 9, 2005

(54) DIGITAL LOOP CARRIER OR OTHER MULTI-SERVICES ACCESS SYSTEM AS A DATA AND VOICE PACKET SERVER

(75) Inventors: Donald E. Crowe, Morris Plains, NJ (US); Harold S. Fluss, West Orange, NJ (US); Allen M. Rush, Millburn, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/575,885

(22) Filed: May 22, 2000

(51) Int. Cl.[7] .............................................. H04L 12/66
(52) U.S. Cl. ....................... 370/352; 370/389; 370/401; 370/465; 379/88.17
(58) Field of Search ................................ 370/352, 353, 370/354, 355, 356, 357, 389, 401, 395.61, 402, 465, 466, 467; 379/88.13, 88.17, 88.18

(56) References Cited

U.S. PATENT DOCUMENTS

| | | | | |
|---|---|---|---|---|
| 4,539,676 A | * | 9/1985 | Lucas ......................... | 370/352 |
| 5,550,906 A | * | 8/1996 | Chau et al. ............. | 379/201.05 |
| 6,064,673 A | * | 5/2000 | Anderson et al. ........... | 370/389 |
| 6,310,941 B1 | * | 10/2001 | Crutcher et al. ............. | 370/352 |
| 6,320,867 B1 | * | 11/2001 | Bellenger et al. ........... | 370/420 |
| 6,335,936 B1 | * | 1/2002 | Bossemeyer et al. ....... | 370/420 |
| 6,496,811 B1 | * | 12/2002 | Bodnar .......................... | 706/3 |
| 6,657,994 B1 | * | 12/2003 | Rajakarunanayake ....... | 370/352 |
| 2001/0040885 A1 | * | 11/2001 | Jonas et al. .................. | 370/352 |
| 2002/0097708 A1 | * | 7/2002 | Deng ........................... | 370/352 |

FOREIGN PATENT DOCUMENTS

| | | | | |
|---|---|---|---|---|
| EP | 0 975 181 A2 | 1/2000 | ............ | H04Q/3/62 |
| WO | WO 98/20702 | 5/1998 | ........... | H04Q/11/04 |

\* cited by examiner

*Primary Examiner*—Dang Ton
*Assistant Examiner*—Shick Hom

(57) ABSTRACT

A multi-services access system, such as a multi-services digital loop carrier (DLC) system for a telecommunications network, has a packet-mode card, such as a digital subscriber line (DSL) card, configured to receive data packets corresponding to one or more data signals and derived-voice packets from a single packet-mode customer premises equipment (CPE) unit, wherein the packet-mode card determines whether each received packet is a data packet or a derived-voice packet. The access system also has a packet interface configured to receive the data packets from the packet-mode card and to transmit the data packets to a packet-switched network for packet-based switching. In addition, the access system has a derived-signal server configured to receive the derived-voice packets from the packet-mode card and to convert the derived-voice packets into a digital voice stream, as well as a controller and a circuit interface configured to receive the digital voice stream from the derived-signal server and to transmit the digital voice stream to a circuit-switched network for circuit-based switching. Since the access system is able to assign resources dynamically to packet-mode CPE units (as opposed to prior-art DLC systems, which have resources pre-assigned), the system of the present invention is able to utilize system resources more efficiently. Moreover, since the system has an internal derived-signal server, there is no need to transmit derived voice signals outside of the system for conversion.

15 Claims, 2 Drawing Sheets

DIGITAL LOOP CARRIER OR OTHER MULTI-SERVICES ACCESS SYSTEM AS A DATA AND VOICE PACKET SERVER

BACKGROUND OF THE INVENTION

1. Field of the Invention

The present invention relates to communication systems offering both analog signal (e.g., voice) and digital signal (e.g., data) telecommunications services.

2. Description of the Related Art

A majority of telephone service subscribers use analog Plain Old Telephone Services (POTS) when placing ordinary voice telephone calls. POTS is generally delivered over a subscriber loop of copper wires installed between each subscriber and either a local telephone company Central Office or a Digital Loop Carrier (DLC) from which the voice signal is digitally transmitted to a Central Office. The Central Office contains circuit-based switches to interconnect each telephone call, and this circuit-based connection is maintained for the duration of a call.

The increased use of computers in businesses and homes has led to an increased load on such circuit-switched telephone networks. Internet traffic is increasingly being transmitted over telephone networks in the form of data calls. The demand for broadband connections to support speedier Web browsing, faster file transfers, and other high-bandwidth applications is constantly increasing. These kinds of communications generally involve periods of high-rate data transmission with long periods of little or no transmission. For such communications, the short-term, peak bandwidth requirements are very high compared to the long-term, average bandwidth requirements. However, in the prior art, even for short-term peak bandwidth calls, the switch (and other network) resources are dedicated for the entire duration of the call. Although voice conversations can be held simultaneously with data calls over a narrowband connection using specialized software and/or hardware, the quality of the voice call and the bandwidth of the data call are compromised.

With the introduction of Digital Subscriber Line (DSL) services over twisted copper pairs, some of these limitations are removed. Subscribers are offered significantly higher bandwidth, and data calls are routed around the circuit switch, directly to a packet-switched network. In some DSL technologies, such as the Asymmetric Digital Subscriber Line (ADSL) system, an analog voice call can share the pair of copper wires with data traffic by using different frequencies. This capability allows the subscriber to simultaneously make or receive analog voice, fax, or modem calls, while maintaining the full bandwidth of the data connection. Furthermore, in DSL implementations, voice calls can be packetized as part of the packet data stream, and either routed entirely through the packet-switched network (if the other party is on the packet-switched network) or sent to a packet-to-circuit gateway, where packetized voice calls are converted to circuit-based voice calls and passed to the circuit-switched network.

Presently, a service provider offering both voice and data services is constrained by traditional equipment such as DLC components that are designed for circuit-switched voice calls and perhaps packet data, but which cannot offer efficient gateway functionality for packetized voice signals (voice packets). In the prior art, a separate gateway is required to handle these packetized voice signals. This separate (external) gateway converts the packetized voice signals to a digital voice stream before the voice signals are transmitted to a circuit-switched network. Accordingly, there is a need for an improved system and method of communicating multiple voice and data streams over a single subscriber loop, which may provide flexible and efficient use of existing infrastructure and reduce the load on circuit-switched telephone network resources.

A Digital Loop Carrier (DLC) system is a communication system where the information carried over the communication medium is transmitted to a circuit-switched network in a digital format DLC systems are now often used by telephone companies as communication systems for voice, digital data information, and analog data information. Analog signals (e.g. voice or analog data information generated by a modem for transmission over a POTS line) are digitized in the DLC system before transmission to the circuit-switched network. Due to the advent of the Internet, there is an increased need to operate these DLC systems to better serve circuit-based voice signals as well as packetized signals at higher and higher bit rates.

Technologies such as digital subscriber line (DSL) services are being developed to allow both analog (e.g., voice) and digital (e.g., data) signals to be transmitted simultaneously over standard twistedpair copper wire telephone lines at multimegabit rates. DSL is seen as an alternative to the more costly and time-consuming installation of high-speed fiber-based broadband communications networks. Competing DSL technologies include asymmetric DSL (ADSL), high-speed DSL (HDSL), symmetric DSL (SDSL), and very high-speed DSL (VDSL), all of which are referred to generically as xDSL. Each is best suited to a different application, with trade-offs made between signal distance and speed and with each having different transmission bandwidth configurations. ADSL is perhaps the best known DSL variant, providing more transmission bandwidth "downstream" to a telephone subscriber than "upstream" from the subscriber. Downstream transmission rates can be as high as 8 Mbit/s, while upstream transmission rates can be as high as 1 Mbit/s or more, each depending on line quality, distance, and wire gauge. Depending on plant conditions, ADSL can transmit data at a rate of 1.544 Mbit/s over distances of up to 6,000 m (about 18,000 ft) using standard 24-gauge wire, and 8 Mbit/s over distances of 4,000 m (about 12,000 ft) or less. ADSL works by sending digital pulses through the telephone wires using a high-frequency portion of the spectrum. Since these high frequencies are above those used by normal voice communications, ADSL can operate concurrently with voice communication over the same telephone wires.

A Digital Subscriber Line Access Multiplexer (DSLAM) is a piece of electronic equipment that can be used to terminate a DSL loop from a subscriber and multiplex the data from a number of such subscribers onto a network feeder. In the case of ADSL, line or POTS splitters at the carrier divide upstream ADSL transmissions, directing voice communications onto the public switched network and data streams to service providers such as Internet Service Providers (ISPs), and join voice and data streams for downstream transmission. Similarly, a POTS splitter at the subscriber's location similarly joins and splits ADSL transmissions, with voice transmissions terminating at a telephone or other POTS apparatus and data transmissions terminating at an ADSL modem.

A multi-services DLC system is a communication system that can encompass the features of the DLC systems and the DSLAM systems. A multi-services DLC system is capable of handling voice signals, data signals, as well as split voice and data signals. The information carried to the circuit-switched and packet-switched networks from this communications system is in a digital format; however, the signals may be switched in a circuit mode or in a packet mode.

FIG. 1 illustrates an exemplary prior art multi-services digital loop carrier (DLC) system 105. Generally, DLC 105 comprises a DSL line card 109, a packet interface 111, a voice card 113, a controller 115, and a circuit interface 117.

Multi-services DLC 105 may be configured to receive different types of voice signals, e.g., analog voice signals from directly coupled telephones such as telephone 121, analog baseband voice signals from indirectly coupled telephones such as telephone 101, and packetized derived voice signals from indirectly coupled telephones such as telephone 133. Multi-services DLC 105 may also be configured to handle data signals initiated by indirectly coupled computers, such as personal computers 103, and 135, and other data sources.

In particular, telephone 121 is directly coupled to voice card 113. For example, voice card 113 can receive analog voice signals from telephone 121 during a call to telephone 127, convert the analog voice signals to digital voice signals, and forward them to controller 115. Controller 115 receives the digital voice signals from voice card 113 and forwards them to circuit-switched network 125 via circuit interface 117, so that the voice signals may be switched in a conventional circuit-switched manner. Circuit-switched network 125 is a conventional circuit-switched communications network that transports and switches voice traffic, in which a dedicated channel (or circuit) is established for the duration of each call. Circuit-switched network 125 comprises one or more switches interconnected to handle and switch digital signals (e.g., digitized voice signals). This circuit-switched network may be a commonly known public switched telephone network (PSTN), which links together wire segments to create a single unbroken line for each telephone call.

Controller 115 has a plurality of functions including bandwidth management, call processing, and overall control functions. For example, controller 115 may be configured to receive on/off requests from voice card 113 and send ringing requests to voice card 113. The operation and configuration of controller 115 is flexible. For example, controller 115 may be configured in accordance with one or more pre-determined parameters/standards. In another example, controller 115 may be configured to place all incoming calls within one or more specified time slots on circuit interface 117.

Voice card 113 has a dedicated port (equivalent to a phone number) for each directly coupled telephone, e.g., telephone 121. When a directly coupled telephone is not in use, the corresponding port remains idle/unused. Similarly, controller 115 has a one-to-one connection with circuit interface 117, where controller 115 receives voice signals from voice card 113 and forwards them to circuit interface 117, which is configured to communicate with circuit-switched network 125.

Multi-services DLC 105 is also configured to handle composite signals comprising baseband POTS analog voice signals and higher-frequency packetized data signals on a single pair of wires. For exemplary purposes, DLC 105 is shown to receive POTS voice signals and packetized data signals from DSL Customer Premises Equipment (CPE) 107. DSL CPE 107 receives POTS voice signals from telephone 101 and data signals from personal computer 103, and combines and forwards these voice and data signals to digital subscriber loop (DSL) line card 109 of DLC 105.

DSL line card 109 receives the combined baseband POTS voice and data signals from DSL CPE 107, and differentiates between the voice signals and the data signals. The data signals are forwarded to packet interface 111, which further routes the data signals to a packet-switched network 119. Packetswitched network 119 is a packet-switched communications network that transports and switches data packets, in which each message is divided into packets before they are sent. Each packet is then transmitted individually and can even follow different routes to its destination. Once all of the packets forming a massage arrive at the destination, they are recombined to reconstruct the original message. Packet-switched network 119 switches the data signals in a known conventional manner and eventually delivers the data signals to its intended destination, e.g., to a destination personal computer 123.

DSL line card 109 forwards the analog baseband POTS voice signals to voice card 113. Voice card 113 converts the analog voice signals from DSL line card 109 to digital voice signals, and forwards them to controller 115 for forwarding to circuit-switched network 125 via circuit interface 117 for conventional circuit-based switching. Voice card 113 processes analog voice signals received from DSL line card 109 in a similar fashion as if the analog signals had been received from a directly coupled unit, e.g., telephone 121.

Prior art DLCs, such as DLC 105 of FIG. 1, rely on the pre-assignment of ports. In DLC 105, the ports on voice card 113 as well as resources between controller 115 and circuit interface 117 are also preassigned for each directly coupled telephone, e.g., telephone 121, and each indirectly coupled telephone, e.g., telephone 101. Thus, irrespective of the origination points, each type of analog signal is handled by its corresponding ports/resources.

DLC 105 is also capable of handling packetized digital voice signals (i.e., voice packets), typically referred to as derived voice (D-V) signals. The D-V signals are switched and handled in a datalike manner. Generally, D-V signals and associated data signals are communicated via a DSL CPE to the DLC. In FIG. 1, for exemplary purposes, it is shown that DSL CPE 131 receives analog POTS voice signals from originating telephone 133 and packetized digital data signals from personal computer 135. CPE 131 converts the analog POTS voice signals from telephone 133 to D-V signals, and delivers both packetized data and D-V signals to DSL line card 109 of multi-services DLC 105.

DSL line card 109 receives the packetized data and D-V signals from DSL CPE 131 and forwards them to packet interface 111, which routes both packetized data and voice signals to an external packet-switched network, e.g., packet-switched network 119. Packet-switched network 119 comprises the components of a traditional packet-switched network. For example, packet-switched network 119 may comprise one or more packet-based switches configured to switch packetized signals.

The D-V signals are switched in a data-like manner by packet-switched network 119. Packetswitched network 119 differentiates between the derived voice signals and the data signals and, using traditional means, switches the data signals to their intended destination (e.g., personal computer 123). Packet-switched network 119 forwards the D-V signals to a remote packet gateway 129 configured to convert packetized D-V signals to circuit-based digital voice signals, so that the voice signals may be switched in a conventional manner by circuit-switched networks, e.g., circuit-switched network 125. Remote packet gateway 129 is not part of DLC 105. Circuit-switched network 125 switches the circuit-based digital voice signals to its intended destination, e.g., telephone 127.

As described, DLC 105 treats the D-V signals received from CPE 131 differently from analog POTS voice signals (e.g., those received from a directly coupled telephone, such as telephone 121, or those received from an indirectly coupled telephone, such as telephone 101). Unlike POTS signals, D-V signals are handled like data signals and forwarded to packet-switched network 119 via packet interface 111.

Packet-switched network 119 may also receive packetized DV and data signals from remote DSL CPEs coupled via remote DSLAMs (Digital Subscriber Line Access Multiplexers). For exemplary purposes, a remote DSLAM 141 is shown to be coupled to packet-switched network 119. Remote DSLAM 141 may be further coupled to one or more remote DSL CPEs, such as DSL CPE 143. Remote DSL CPE 143 may receive analog POTS voice signals and data packets, respectively, from telephone 145 and personal computer 147, and then packetize the analog voice signals and combine them with the data packets to transmit packetized D-V and data signals to DSLAM 141 using DSL technology. Packets-witched network 119 switches the data signals in a conventional manner, e.g., the data signals may be forwarded to computer 123. In addition, packet-switched network 119 forwards the D-V signals to remote packet gateway 129 for conversion. As described earlier, remote packet gateway 129 converts the D-V signals to circuit-based voice signals, so that these digital signals may be switched by circuit-switched network 125 in a conventional manner.

The multi-services DLC 105 of FIG. 1 is capable of handling different types of voice and data signals. However, this multi-services DLC system is very limited in a few aspects. For example, each origination source, e.g., telephone 101 or telephone 121, has pre-assigned ports/system resources, where system resources refers generally to hardware and software resources on the controller and allocations of bandwidth on internal digital voice links. This requirement of pre-assignment makes it impossible to handle signals from virtual sources. In the case of cell-based voice signals such as those carried over ATM (Asynchronous Transfer Mode), the origination source may vary from call to call or may be unknown. In these instances, prior art DLC 105 is unsuitable, because, in prior art DLC 105, each port on voice card 113 and corresponding resources on controller 115 and circuit interface 117 must be pre-assigned. As such, prior art DLC 105 relies on the use of an external packet gateway, e.g., remote packet gateway 129. This requirement requires additional space and cost.

SUMMARY OF THE INVENTION

The present invention is directed to a multi-services access system that is capable of handling circuit-based voice signals as well as packetized voice signals. All the capabilities, including conversion capabilities are enclosed within the access system and no external gateway is required to convert packet-based signals into circuit-based signals, and vice versa. The present invention analyzes incoming circuit-based voice signals and packetized voice signals and dynamically assigns system resources. Thus, system resources are not pre-assigned/dedicated to particular remote sources. As a result, the same resources can be used for a plurality of incoming packetized signals.

In one embodiment, a digital loop carrier (DLC) system capable of efficiently handling voice and data signals is provided. The DLC system of the present-invention comprises a digital subscriber line (DSL) line card, a derived-signal server, and a controller. The DSL line card can receive a mix of packetized data signals and packetized voice signals, and differentiates the data signals from the voice signals. The data signals are forwarded to a packet interface to be handled in accordance with packet transfer mode requirements, while the packetized voice signals are forwarded to a derived-signal server. The derived-signal server can transform packetized voice signals to circuit-based voice signals so that voice signals can be transmitted directly to a circuit-switched network for circuit-based switching in a conventional manner. Furthermore, the derived-signal server sends incoming analog voice signals to a voice card, and the call is treated the same as a call from any other subtending analog phone. Additionally, the DLC system may receive packetized voice signals from remote sources through its packet interface. In this case, the derived voice signals are forwarded to the derived-signal server to be transformed to circuit-based signals. The circuit-based signals are then forwarded to a circuit-switched network in a conventional manner for circuit-based switching.

Unlike the prior art, in the present invention, system resources are not pre-specified to particular ports/destinations. Instead, the controller evaluates each incoming packetized voice signal, determines the required needs, and accordingly allocates system resources. All the determinations are made in real time, and system resources are dynamically allocated based on these real-time determinations. Furthermore, the use of the present invention eliminates the need for an external gateway. Instead, capabilities for converting packets to circuit-based signals, and vice versa, are provided within the proposed system e.g., within a single multi-services access system.

In one embodiment, the present invention is a multi-services access system for a telecommunication network, comprising (a) a packet-mode card capable of being coupled to one or more local derived-signal customer premises equipment (CPE) units to (1) receive upstream packetized data signals and upstream packetized derived signals from the one or more local packet-mode CPE units and (2) transmit downstream packetized data signals and downstream packetized derived signals to the one or more local packet-mode CPE units; (b) a packet interface capable of being coupled to a packet-switched network to (1) transmit upstream packetized data signals and downstream packetized derived signals to the packet-switched network and (2) receive downstream packetized data signals and upstream packetized derived signals from the packet-switched network; (c) a circuit interface capable of being coupled to a circuit-switched network to (1) transmit upstream digital streams to the circuit-switched network and (2) receive downstream digital streams from the circuit-switched network; (d) a controller coupled to the circuit interface; and (e) a derived-signal server coupled to the packet-mode card, the packet interface, and the controller. The packet-mode card forwards each received upstream packetized data signal to the packet interface for transmission to the packet-switched network. The packet interface forwards each received downstream packetized data signal destined for a local packet-mode CPE unit to the packet-mode card for transmission to the local packet-mode CPE unit. The packet-mode card and the packet interface both forward each corresponding received upstream packetized derived signal to the derived-signal server, which converts the upstream packetized derived signal into an upstream digital stream and forwards the upstream digital stream to the controller, which forwards the upstream digital stream to the circuit interface, which transmits the upstream digital stream to the circuit-switched network. The circuit interface forwards each received downstream digital stream to the controller. If the downstream digital stream is destined for a local packet-mode CPE unit, then the controller forwards the downstream digital stream to the derived-signal server, the derived-signal server converts the downstream digital stream into a downstream packetized derived signal and forwards the downstream packetized derived signal to the packet-mode card, which transmits the downstream packetized derived signal to the local packet-mode CPE unit. If the downstream digital stream is destined for a remote packet-mode CPE unit (e.g., 143), then the controller forwards the downstream digital stream to the derived-signal server, the derived-signal server converts the downstream digital stream into a downstream packetized derived signal and forwards the downstream packetized derived signal to the packet interface, which transmits the downstream packetized derived signal to the packet-switched network for routing to the remote packet-mode CPE unit.

In a preferred implementation of this embodiment, the multi-services access system further comprises a circuit-mode card coupled to the controller and capable of being coupled to one or more circuit-mode CPE units to (1) receive upstream circuit-mode signals from the one or more circuit-mode CPE units and (2) transmit downstream circuit-mode signals to the one or more circuit-mode CPE units. The circuit-mode card converts each upstream circuit-mode signal into an upstream digital stream and forwards the upstream digital stream to the controller, which forwards the upsteam digital stream to the circuit interface, which transmits the upstream digital stream to the circuit-switched network. If a downstream digital stream received by the controller from the circuit interface is destined for a circuit-mode CPE unit, then the controller forwards the downstream digital stream to the circuit-mode card, which converts the downstream digital stream into a downstream circuit-mode signal and transmits the downstream circuit-mode signal to the circuit-mode CPE unit. The circuit-mode card is further coupled to the packet-mode card, wherein the packet-mode card is capable of being coupled to one or more combined circuit/packet-mode CPE units to (1) receive upstream combined circuit/packet-mode signals from the one or more combined circuit/packet-mode CPE units and (2) transmit downstream combined circuit/packet-mode signals to the one or more combined circuit/packet-mode CPE units. The packet-mode card separates each upstream combined circuit/packet-mode signal received from a combined circuit/packet-mode CPE unit into an upstream packetized data signal and an upstream circuit-mode signal. The packet-mode card forwards the upstream packetized data signal to the packet interface, which transmits the upstream packetized data signal to the packet-switched network. The packet-mode card forwards the upstream circuit-mode signal to the circuit-mode card, which converts the upstream circuit-mode signal into an upstream digital stream and forwards the upsteam digital stream to the controller, which forwards the upstream digital stream to the circuit interface, which transmits the upstream digital stream to the circuit-switched network. If a downstream packetized data signal received by the packet interface from the packet-switched network is destined for a combined circuit/packet-mode CPE unit, then the packet interface forwards the downstream packetized data signal to the packet-mode card, which combines the downstream packetized data signal with any corresponding downstream circuit-mode signal and transmits the resulting downstream combined circuit/packet-mode signal to the combined circuit/packet-mode CPE unit. If a downstream digital stream received by the controller from the circuit interface is destined for a combined circuit/packet-mode CPE unit, then the controller forwards the downstream digital stream to the circuit-mode card, which converts the downstream digital stream into a downstream circuit-mode signal and transmits the downstream circuit-mode signal to the packet-mode card, which combines the downstream circuit-mode signal with any corresponding downstream packetized data signal and transmits the resulting downstream combined circuit/packet-mode signal to the combined circuit/packet-mode CPE unit.

In a further preferred implementation of this embodiment, the multi-services access system is a multi-services digital loop carrier (DLC) system; the packet-mode card is digital subscriber line (DSL) line card; the circuit-mode card is a voice card; the one or more circuit-mode CPE units are telephones; the one or more local and remote packet-mode CPE units and the one or more combined circuit/packet CPE units are DSL CPE units; the packetized derived signals comprise packetized derived voice signals; the DLC system does not have individual dedicated resources for each local packet-mode CPE unit; and the DLC system dynamically allocates, in real time, system resources for each local packet-mode CPE unit.

In another embodiment, the present invention is a method for processing signals in a multi-services access system for a telecommunication network, the access system capable of being coupled directly to one or more local packet-mode CPE units, a packet-switched network, and a circuit-switched network, comprising the steps of (a) transmitting each upstream packetized data signal received from a local packet-mode CPE unit to the packet-switched network; (b) if a downstream packetized data signal received from the packet-switched network is destined for a local packet-mode CPE unit, then transmitting the downstream packetized data signal to the local packet-mode CPE unit; (c) converting each upstream packetized derived signal received from either a local packet-mode CPE unit or the packet-switched network into an upstream digital stream and transmitting the upstream digital stream to the circuit-switched network; (d) if a downstream digital stream received from the circuit-switched network is destined for a local packet-mode CPE unit, then converting the downstream digital stream into a downstream packetized derived signal and transmitting the downstream packetized derived signal to the local packet-mode CPE unit; and (e) if a downstream digital stream received from the circuit-switched network is destined for a remote packet-mode CPE unit, then converting the downstream digital stream into a downstream packetized derived signal and transmitting the downstream packetized derived signal to the packet-switched network for routing to the remote packet-mode CPE unit.

In a preferred implementation of this embodiment, the access system is further capable of being coupled to one or more circuit-mode CPE units and one or more combined circuit packet-mode CPE units, and the method further comprises the steps of (f) converting each upstream circuit-mode signal received from a circuit-mode CPE unit into an upstream digital stream and transmitting the upstream digital stream to the circuit-switched network; (g) if a downstream digital stream received from the circuit interface is destined for a circuit-mode CPE unit, then converting the downstream digital stream into a downstream circuit-mode signal and transmitting the downstream circuit-mode signal to the circuit-mode CPE unit; (h) separating each upstream combined circuit/packet-mode signal received from a combined circuit/packet-mode CPE unit into an upstream packetized data signal and an upstream circuit-mode signal; (i) transmitting the upstream packetized data signal to the packet-switched network; (j) converting the upstream circuit-mode signal into an upstream digital stream and transmitting the upstream digital stream to the circuit-switched network; (k) if a downstream packetized data signal received from the packet-switched network is destined for a combined circuit packet-mode CPE unit, then combining the downstream packetized data signal with any corresponding downstream circuit-mode signal and transmitting the resulting downstream combined circuit/packet-mode signal to the combined circuit/packet-mode CPE unit; and (1) if a downstream digital stream received from the circuit-switched network is destined for a combined circuit/packet-mode CPE unit, then converting the downstream digital stream into a downstream circuit-mode signal, combining the downstream circuit-mode signal with any corresponding downstream packetized data signal, and transmitting the resulting downstream combined circuit/packet-mode signal to the combined circuit/packet-mode CPE unit.

In a further preferred implementation of this embodiment, the multi-services access system is a multi-services digital loop carrier (DLC) system; the one or more circuit-mode CPE units are telephones; the one or more local and remote packet-mode CPE units and the one or more combined circuit/packet CPE units are DSL CPE units; the packetized derived signals comprise packetized derived voice signals; the DLC system does not have individual dedicated resources for each local packet-mode CPE unit; and the DLC system dynamically allocates, in real time, system resources for each local packet-mode CPE unit.

In yet another embodiment, the present invention is a method for processing signals in a multi-services access system for a telecommunication network, comprising the steps of (a) receiving packetized data signals and packetized derived signals from a packet-mode CPE unit; (b) determining whether each packet received from the packet-mode CPE unit is a data packet or a derived packet; (c) transmitting each data packet from the packet-mode CPE unit directly to a packet-switched network for packet-based switching; and (d) converting each derived packet from the packet-mode CPE unit into a digital stream and transmitting the digital stream directly to a circuit-switched network for circuit-based switching.

In a preferred implementation of this embodiment, the method further comprises the steps of (e) receiving a digital stream directly from the circuit-switched network; (f) converting the digital stream into a packetized derived signal; and (g) transmitting the packetized derived signal to the packet-mode CPE unit. The access system does not have individual dedicated resources for the packet-mode CPE unit; the access system dynamically allocates, in real time, system resources for the packet-mode CPE unit; and the access system enables the packet-mode CPE unit to transmit and receive packetized derived signals to and from the circuit-switched network without using any packet-switched network and without using any external gateway interconnecting the circuit-switched network and a packet-switched network.

In a further preferred implementation of this embodiment, the multi-services access system is a multi-services digital loop carrier (DLC) system; the packet-mode CPE unit is a DSL CPE unit; and the packetized derived signals comprise packetized derived voice signals.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2:
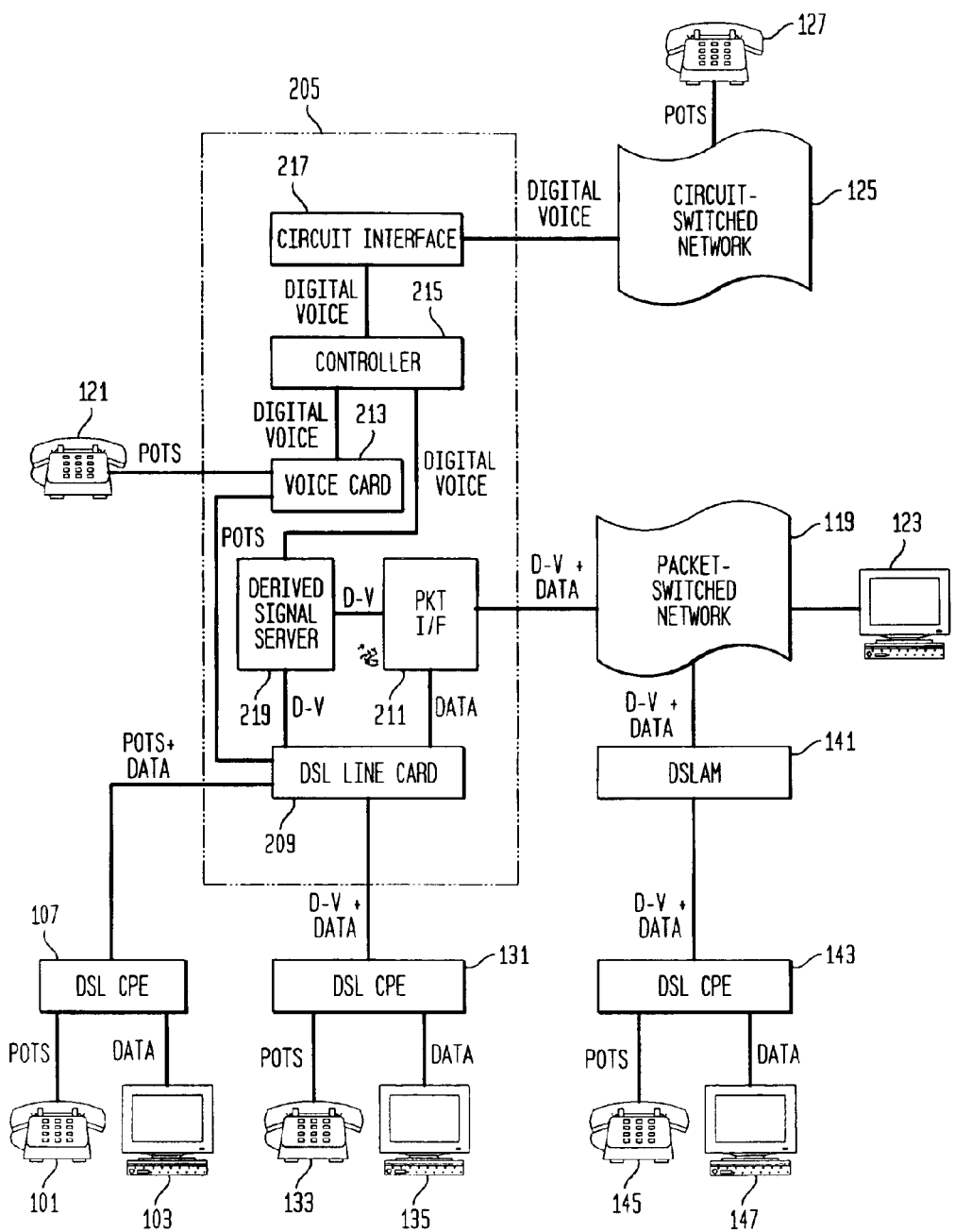
FIG. 2 illustrates a multi-services DLC system, in accordance with one embodiment of the present invention.

FIG. 2 illustrates a multi-services digital loop carrier (DLC) system 205, in accordance with one embodiment of the present invention. Multi-services DLC 205 of the present invention overcomes some of the previously mentioned shortcomings in the prior art.

Figure 1:
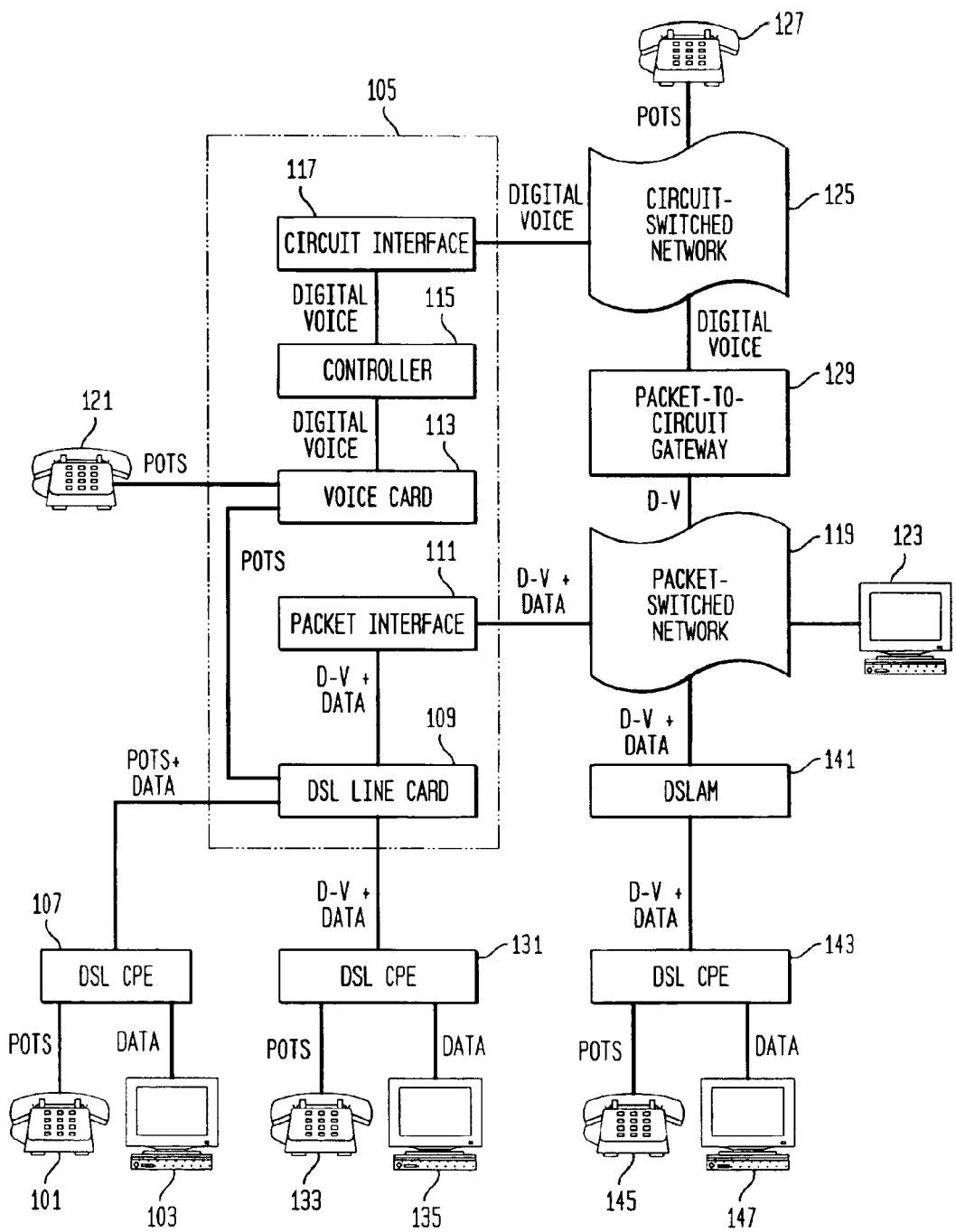
FIG. 1 illustrates a prior art digital loop carrier (DLC) system configured to handle voice and data signals.

DLC 205 comprises a DSL line card 209, a packet interface 211, a voice card 213, a controller 215, and a circuit interface 217. In addition, DLC 205 has a derived-signal server 219 located within the DLC. Like prior art DLC 105 of FIG. 1, DLC 205 is capable of handling circuit-based digital voice signals as well as analog POTS voice signals and packetized derived voice (D-V) signals. Unlike the prior art, however, the present invention does not require a remote packet-circuit gateway, such as gateway 129 of FIG. 1.

As shown in FIG. 2, like prior art DLC 105, DLC 205 can be directly coupled to:

Telephone 121 via voice card 213;

DSL CPE 107 via DSL line card 209, where DSL CPE 107 is in turn coupled to telephone 101 and computer 103;

DSL CPE 131 via DSL line card 209, where DSL CPE 131 is in turn directly coupled to telephone 133 and computer 135;

Circuit-switched network 125 via circuit interface 217, where circuit-switched network 125 is coupled to telephone 127; and Packet-switched network 119 via packet interface 211, where packet-switched network 119 is in turn coupled to telephone 145 and computer 147 via DSLAM 142 and DSL CPE 143 as well as to computer 123.

The processing of the various types of signals received from and transmitted to these different devices and networks by DLC 205 is analogous to the processing of similar signals by DLC 105, with (at least) the following differences.

When DSL line card 209 receives packetized data and derived voice signals from DSL CPE 131, DSL line card 209 differentiates between the packetized data signals and the packetized D-V signals (e.g., based on the packet header information) and forwards the packetized data signals to packet interface 211 and the packetized D-V signals to derived-signal server 219. Derived-signal server converts the packetized D-V signals into a digital voice stream and forwards the digital voice stream to controller 215, which forwards the digital voice signals to circuit-switched network 125 via circuit interface 217 for conventional circuit-based switching. Note that the switching performed by circuit-switched network 125 may result in that same digital voice stream being routed back to DLC 205 if the destination telephone for those signals also happens to be served by DLC 205.

Analogously, when packet interface 211 receives packetized data and packetized D-V signals from packet-switched network 119, it distinguishes between the packetized data signals and the packetized D-V signals (e.g., by the address information in the header of each packet) and forwards the packetized data signals to DSL line card 209, for example, for forwarding to either DSL CPE 107 or DSL CPE 131, while the packetized D-V signals are forwarded to derived-signal server 219. As before, derived-signal server 219 converts the packetized D-V signals into a digital voice stream and forwards the digital voice stream to controller 215, which forwards the digital voice signals to circuit-switched network 125 via circuit interface 217 for conventional circuit-based switching.

Meanwhile, controller 215 receives digital voice signals from circuit interface 217 that have been switched by circuit-switched network 125. If a digital voice signal is destined for a POTS telephone, such as telephone 101 or 121, then controller 215 forwards the digital voice signal to voice card 213, which converts the digital voice signal into an analog voice signal and forwards the analog voice signal either directly to a subtending telephone like telephone 121 or to DSL line card 209, for example, for transmission to telephone 101 via DSL CPE 107.

If, on the other hand, a digital voice signal received by controller 215 from circuit interface 217 is destined for a derived voice user, such as telephone 133 or 145, then controller 215 forwards the digital voice signal to derived-signal server 219, which converts the digital voice signal into packetized D-V signals and forwards the packetized D-V signals to either packet interface 211 (e.g., for transmission to telephone 145 via packet-switched network 119, DSLAM 141, and DSL CPE 143) or DSL line card 209 (e.g., for transmission to telephone 133 via DSL CPE 131).

By having a derived-signal server 219 within DLC 205, derived voice signals do not have to be forwarded to or handled by an external packet-switched network, such as packet-switched network 119, but, instead, can be handled by DLC 205 for transmission directly to circuit-switched network 125. As such, the addition of derived-signal server 219 eliminates the need for an external gateway, such as gateway 129 of FIG. 1. This results in cost and space savings. Furthermore, DLC 205 can handle derived-voice signals from remote sources, e.g., virtual sources in ATM technologies.

The use of DLC 205 results in increased efficiency and a better use of available bandwidth. Unlike the prior art, dedicated ports are not provided for derived voice users, such as telephone 133, in preferred embodiments of the present invention. Instead, DLC system 205 dynamically assigns system resources for derived voice signals. Thus, a plurality of remote terminals, including DSLAMs, may be served from a single DLC/DSLAM. The incoming signals are evaluated to determine whether they correspond to data or voice. Then, resources are allocated based on this real/time determination. Furthermore, since packetized voice signals are converted to circuit-based voice signals and then switched by a circuit-switched network in a conventional manner, the voice quality is maintained.

The resources on the controller as well as on the circuit interface are not pre-assigned to particular remote D-V sources. Instead, the resources may be shared by a plurality of incoming D-V signals. Generally, system resources are assigned for either the duration of the call or the duration of the transfer. After the call (or transfer) is over, the system resources are freed and made available for the next call (or transfer).

FIG. 2 represents the present invention in accordance with one embodiment but, in practice, the present invention may be implemented in many different ways. For example, in addition to handling D-V signals from remote sources, DLC 205 may be configured to handle video telephony, and, in addition to handling data signals from a personal computer, DLC 205 may be configured to handle broadcast digital video and interactive television. Such applications are popular in the context of multiple access on broadband fiber/coaxial cable networks. The present invention adapts to changing demands of a mix of circuit mode and packet transfer mode applications and efficiently allocates bandwidth to a variety of bursty and isochronous traffic resources.

The present invention may be utilized for well-known Asynchronous Transfer Mode (ATM) and Internet Protocol (IP) applications. DLC 205 may be used to enhance the delivery of voice telephony (i.e., POTS) service via an ATM cell transport or via IP packet transport. DLC 205 can also serve as a gateway between the TDM-based interface to a voice class 5 switch (e.g., using TR-08, GR-303, V5.2 standards) and the packet cell-based voice transport provided over an access transmission media such as copper loop with xDSL.

The present invention is flexible and may be used for dynamically associating hardware and/or software resources equipped in a system configured to handle cell-based voice calls. Hardware or software in accordance with the present invention detects a condition through the TDM-based or cellbased voice conversion hardware. This condition is typically either an incoming ringing condition or an off-hook condition. The hardware or software associates the identification of the active call (i.e., subscriber telephone number or call reference value on the TDM interface, and IP or ATM address on the subscriber distribution port side) and maps a given set of system resources to a given active call. The system resources remain mapped to these ports for the duration of the active call. At the termination of the call, the system resources are de-mapped from the active ports once made available to a new call.

Thus, the present invention eliminates the prior art requirement of dedicated ports for derived voice users. Instead, the DLC of the present invention relies on real-time measurement of system resources and accordingly allocates system resources to incoming D-V calls.

In one embodiment, the present invention is a digital loop carrier (DLC) system comprising a derived-signal server that enables the DLC system to process (including receiving and/or transmitting) derived voice (D-V) signals in addition to other digitized signals (e.g., video telephony, personal computer data, broadcast digital video, interactive television) that are either circuit mode or packet transfer mode signals so that the DLC system can receive and transmit these signals directly from and to a destination network (e.g., a circuit-switched network) without the use of an external gateway. The DLC system of the present invention is able to allocate (as needed) system resources (e.g., interface ports, bandwidth) to a plurality of digitized signals from remote terminals or signal sources (e.g., DSLAMS). Unlike the prior art DLC system, in the present invention, no system resources are dedicated to particular derived signals or derived signal sources.

Although some of the processing of the present invention has been described in the context of the flow of voice and/or data signals in particular directions, it will be understood that each link shown in FIG. 2 as connecting different components and/or networks is a bidirectional link that is capable of transmitting similar types of signals in both directions, where those different signals are generated and processed appropriately by the corresponding transmitting and receiving components and/or networks, such that any pair of phones and any pair of computers shown in FIG. 2 can communicate with one another via DLC system 205. There may be applications, however, such as in broadcasting, where communications are uni-directional.

Similarly, although the voice signals transmitted to and from the various telephones in FIG. 2 are all labeled "POTS," in alternative embodiments, these voice signals could be other types of analog voice signals. In addition, the voice signals transmitted to and from certain telephones, such as telephone 101 or 121, could be digital voice signals, such as ISDN (Integrated Services Digital Network) voice signals, in which case, DSL line card 209 and/or voice card 213 would need to be appropriately modified to handle those digital voice signals.

Furthermore, the signals carried over any of the POTS lines could be analog signals other than voice signals, such as analog fax or modem signals, from analog devices other than telephones, such as faxes or modems. In that sense, any of the telephones in FIG. 2 could be a different type of terminals that transmits and receives the corresponding type of analog signals. As such, voice card 213 may be referred to more generally as an "analog signal" card that converts analog signals into digital streams and vice versa. Analogously, the derived voice signals could be considered to be a specific type of the more generic category of "derived" signals that include "derived fax" signals and "derived modem" signals in addition to derived voice signals.

Although the present invention has been described in the context of a multi-services digital loop carrier (DLC) system for a telecommunications network, that is only one possible application for the present invention related to a derived voice server/gateway in a box having a circuit-switched (assigned) character. In other embodiments, the present invention could be implemented as analogous multiservices access systems for applications other than digital loop carriers, such as DSLAMs, access concentrators, or other hybrid circuit/packet network elements.

FIG. 2 shows a particular embodiment of the present invention as a digital loop carrier system. The present invention can be generalized as a multi-services access system in a number of ways. For example, DSL line card 209 is a particular type of packet-mode card capable of handling either (1) "pure" packet-mode signals comprising packetized data signals and/or packetized derived signals, such as derived voice signals, or (2) combined circuit/packet-mode signals comprising packetized data signals and circuit-mode signals, such as analog voice signals. In addition, voice card 213 is a particular type of circuit-mode card capable of converting circuit-mode signals, such as analog voice signals, into digital streams, and vice versa.

As used in this specification, when used to modify "data" signals, the term "upstream" refers to the direction towards the packet-switched network, while the term "downstream" refers to the direction away from the packet-switched network. When used to modify "voice" signals, whether formatted as analog signals, derived packets, or digital streams, the term "upstream" refers to the direction towards the circuit-switched network, while the term "downstream" refers to the direction away from the circuit-switched network.

The term "local" refers to CPE units that are directly coupled to the access system, such as CPE 131, while the term "remote" refers to CPE units that are coupled to the access system through an external network, such as CPE 143, which is coupled to access system 205 via packet-switched network 119 and DSLAM 141.

POTS telephone 121 is a particular type of circuit-mode CPE unit supported by access system 205. In general, such circuit-mode CPE units may be other devices that generate circuit-mode signals such as analog devices such as POTS telephones, fax machines, or modems, or even digital devices, such as ISDN telephones that generate digital streams. Similarly, DSL CPE units 107 and 131 are particular types of packet-mode CPE units. DSL CPE 131 handles packetized data signals as well as packetized derived signals, while DSL CPE 107 is a type of combined circuit/packet-mode CPE unit that handles circuit-mode signals, like POTS voice signals, as well as packetized data signals. As such, DSL CPE 107 could be considered to be both a type of circuit-mode CPE unit as well as a type of packet-mode CPE unit.

Although the term "card" is used to refer to certain components in the DLC system of the present invention, it will be understood that the functionality provided by those components can be implemented in hardware and/or software other than computer plug-in cards.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A multi-services access system for a telecommunication network, comprising:

(a) a packet-mode card capable of being coupled to one or more local derived-signal customer premises equipment (CPE) units to (1) receive upstream packetized data signals and upstream packetized derived voice signals from the one or more local packet-mode CPE units and (2) transmit downstream packetized data signals and downstream packetized derived voice signals to the one or more local packet-mode CPE units;

(b) a packet interface capable of being coupled to a packet-switched network to (1) transmit upstream packetized data signals and downstream packetized derived voice signals to the packet-switched network and (2) receive downstream packetized data signals and upstream packetized derived voice signals from the packet-switched network;

(c) a circuit interface capable of being coupled to a circuit-switched network to (1) transmit upstream digital streams to the circuit-switched network and (2) receive downstream digital streams from the circuit-switched network;

(d) a controller coupled to the circuit interface; and (e) a derived-signal server coupled to the packet-mode card, the packet interface, and the controller, wherein:

at least one of the packet-mode card and the packet interface is capable of distinguishing packetized data signals from packetized derived voice signals;

the packet-mode card forwards each received upstream packetized data signal to the packet interface for transmission to the packet-switched network;

the packet interface forwards each received downstream packetized data signal destined for a local packet-mode CPE unit to the packet-mode card for transmission to the local packet-mode CPE unit;

the packet-mode card and the packet interface both forward each corresponding received upstream packetized derived voice signal to the derived-signal server, which converts the upstream packetized derived voice signal into an upstream digital stream and forwards the upstream digital stream to the controller, which forwards the upstream digital stream to the circuit interface, which transmits the upstream digital stream to the circuit-switched network; and the circuit interface forwards each received downstream digital stream to the controller, wherein:

if the downstream digital stream is destined for a local packet-mode CPE unit, then the controller forwards the downstream digital stream to the derived-signal server, the derived-signal server converts the downstream digital stream into a downstream packetized derived voice signal and forwards the downstream packetized derived voice signal to the packet-mode card, which transmits the downstream packetized derived voice signal to the local packet-mode CPE unit; and if the downstream digital stream is destined for a remote packet-mode CPE unit, then the controller forwards the downstream digital stream to the derived-signal server, the derived-signal server converts the downstream digital stream into a downstream packetized derived voice signal and forwards the downstream packetized derived voice signal to the packet interface, which transmits the downstream packetized derived voice signal to the packet-switched network for routing to the remote packet-mode CPE unit.

2. The multi-services access system of claim 1, wherein the access system does not have individual dedicated resources for each local packet-mode CPE unit.

3. The multi-services access system of claim 1, wherein the access system dynamically allocates, in real time, system resources for each local packet-mode CPE unit.

4. The multi-services access system of claim 1, further comprising a circuit-mode card coupled to the controller and capable of being coupled to one or more circuit-mode CPE units to (1) receive upstream circuit-mode signals from the one or more circuit-mode CPE units and (2) transmit downstream circuit-mode signals to the one or more circuit-mode CPE units, wherein:

the circuit-mode card converts each upstream circuit-mode signal into an upstream digital stream and forwards the upstream digital stream to the controller, which forwards the upstream digital stream to the circuit interface, which transmits the upstream digital stream to the circuit-switched network; and if a downstream digital stream received by the controller from the circuit interface is destined for a circuit-mode CPE unit, then the controller forwards the downstream digital stream to the circuit-mode card, which converts the downstream digital stream into a downstream circuit-mode signal and transmits the downstream circuit-mode signal to the circuit-mode CPE unit.

5. The multi-services access system of claim 4, wherein the circuit-mode card is further coupled to the packet-mode card, wherein the packet-mode card is capable of being coupled to one or more combined circuit/packet-mode CPE units to (1) receive upstream combined circuit/packet-mode signals from the one or more combined circuit/packet-mode CPE units and (2) transmit downstream combined circuit/packet-mode signals to the one or more combined circuit/packet-mode CPE units, wherein:

the packet-mode card separates each upstream combined circuit/packet-mode signal received from a combined circuit/packet-mode CPE unit into an upstream packetized data signal and an upstream circuit-mode signal, wherein:

the packet-mode card forwards the upstream packetized data signal to the packet interface, which transmits the upstream packetized data signal to the packet-switched network; and the packet-mode card forwards the upstream circuit-mode signal to the circuit-mode card, which converts the upstream circuit-mode signal into an upstream digital stream and forwards the upstream digital stream to the controller, which forwards the upstream digital stream to the circuit interface, which transmits the upstream digital stream to the circuit-switched network;

if a downstream packetized data signal received by the packet interface from the packet-switched network is destined for a combined circuit/packet-mode CPE unit, then the packet interface forwards the downstream packetized data signal to the packet-mode card, which combines the downstream packetized data signal with any corresponding downstream circuit-mode signal and transmits the resulting downstream combined circuit/packet-mode signal to the combined circuit/packet-mode CPE unit; and if a downstream digital stream received by the controller from the circuit interface is destined for a combined circuit/packet-mode CPE unit, then the controller forwards the downstream digital stream to the circuit-mode card, which converts the downstream digital stream into a downstream circuit-mode signal and transmits the downstream circuit-mode signal to the packet-mode card, which combines the downstream circuit-mode signal with any corresponding downstream packetized data signal and transmits the resulting downstream combined circuit/packet-mode signal to the combined circuit/packet-mode CPE unit.

6. The multi-services access system of claim 5, wherein:

the multi-services access system is a multi-services digital loop carrier (DLC) system;

the packet-mode card is digital subscriber line (DSL) line card;

the circuit-mode card is a voice card;

the one or more circuit-mode CPE units are telephones;

the one or more local and remote packet-mode CPE units and the one or more combined circuit/packet CPE units are DSL CPE units;

the DLC system does not have individual dedicated resources for each local packet-mode CPE unit; and the DLC system dynamically allocates, in real time, system resources for each local packet-mode CPE unit.

7. A multi-services access system for a telecommunication network, comprising:

(a) a packet-mode card capable of being coupled to one or more local derived-signal customer premises equipment (CPE) units to (1) receive upstream packetized data signals and upstream packetized derived signals from the one or more local packet-mode CPE units and (2) transmit downstream packetized data signals and downstream packetized derived signals to the one or more local packet-mode CPE units;

(b) a packet interface capable of being coupled to a packet-switched network to (1) transmit upstream packetized data signals and downstream packetized derived signals to the packet-switched network and (2) receive downstream packetized data signals and upstream packetized derived signals from the packet-switched network;

(c) a circuit interface capable of being coupled to a circuit-switched network to (1) transmit upstream digital streams to the circuit-switched network and (2) receive downstream digital streams from the circuit-switched network;

(d) a controller coupled to the circuit interface; and (e) a derived-signal server coupled to the packet-mode card, the packet interface, and the controller, wherein:

the packet-mode card forwards each received upstream packetized data signal to the packet interface for transmission to the packet-switched network;

the packet interface forwards each received downstream packetized data signal destined for a local packet-mode CPE unit to the packet-mode card for transmission to the local packet-mode CPE unit;

the packet-mode card and the packet interface both forward each corresponding received upstream packetized derived signal to the derived-signal server, which converts the upstream packetized derived signal into an upstream digital stream and forwards the upstream digital stream to the controller, which forwards the upstream digital stream to the circuit interface, which transmits the upstream digital stream to the circuit-switched network;

the circuit interface forwards each received downstream digital stream to the controller, wherein:

if the downstream digital stream is destined for a local packet-mode CPE unit, then the controller forwards the downstream digital stream to the derived-signal server, the derived-signal server converts the downstream digital stream into a downstream packetized derived signal and forwards the downstream packetized derived signal to the packet-mode card, which transmits the downstream packetized derived signal to the local packet-mode CPE unit; and if the downstream digital stream is destined for a remote packet-mode CPE unit, then the controller forwards the downstream digital stream to the derived-signal server, the derived-signal server converts the downstream digital stream into a downstream packetized derived signal and forwards the downstream packetized derived signal to the packet interface, which transmits the downstream packetized derived signal to the packet-switched network for routing to the remote packet-mode CPE unit;

further comprising a circuit-mode card coupled to the controller and capable of being coupled to one or more circuit-mode CPE units to (1) receive upstream circuit-mode signals from the one or more circuit-mode CPE units and (2) transmit downstream circuit-mode signals to the one or more circuit-mode CPE units, wherein:

the circuit-mode card converts each upstream circuit-mode signal into an upstream digital stream and forwards the upstream digital stream to the controller, which forwards the upstream digital stream to the circuit interface, which transmits the upstream digital stream to the circuit-switched network; and if a downstream digital stream received by the controller from the circuit interface is destined for a circuit-mode CPE unit, then the controller forwards the downstream digital stream to the circuit-mode card, which converts the downstream digital stream into a downstream circuit-mode signal and transmits the downstream circuit-mode signal to the circuit-mode CPE unit;

the circuit-mode card is further coupled to the packet-mode card, wherein the packet-mode card is capable of being coupled to one or more combined circuit/packet-mode CPE units to (1) receive upstream combined circuit/packet-mode signals from the one or more combined circuit/packet-mode CPE units and (2) transmit downstream combined circuit/packet-mode signals to the one or more combined circuit/packet-mode CPE units, wherein:

the packet-mode card separates each upstream combined circuit/packet-mode signal received from a combined circuit/packet-mode CPE unit into an upstream packetized data signal and an upstream circuit-mode signal, wherein:

the packet-mode card forwards the upstream packetized data signal to the packet interface, which transmits the upstream packetized data signal to the packet-switched network; and the packet-mode card forwards the upstream circuit-mode signal to the circuit-mode card; which converts the upstream circuit-mode signal into an upstream digital stream and forwards the upstream digital stream to the controller, which forwards the upstream digital stream to the circuit interface, which transmits the upstream digital stream to the circuit-switched network;

if a downstream packetized data signal received by the packet interface from the packet-switched network is destined for a combined circuit/packet-mode CPE unit, then the packet interface forwards the downstream packetized data signal to the packet-mode card, which combines the downstream packetized data signal with any corresponding downstream circuit-mode signal and transmits the resulting downstream combined circuit/packet-mode signal to the combined circuit/packet-mode CPE unit; and if a downstream digital stream received by the controller from the circuit interface is destined for a combined circuit/packet-mode CPE unit, then the controller forwards the downstream digital stream to the circuit-mode card, which converts the downstream digital stream into a downstream circuit-mode signal and transmits the downstream circuit-mode signal to the packet-mode card, which combines the downstream circuit-mode signal with any corresponding downstream packetized data signal and transmits the resulting downstream combined circuit/packet-mode signal to the combined circuit/packet-mode CPE unit.

8. The multi-services access system of claim 7, wherein the access system does not have individual dedicated resources for each local packet-mode CPE unit.

9. The multi-services access system of claim 7, wherein the access system dynamically allocates, in real time, system resources for each local packet-mode CPE unit.

10. The multi-services access system of claim 7, wherein:

the multi-services access system is a multi-services digital loop carrier (DLC) system;

the packet-mode card is digital subscriber line (DSL) line card;

the circuit-mode card is a voice card;

the one or more circuit-mode CPE units are telephones;

the one or more local and remote packet-mode CPE units and the one or more combined circuit/packet CPE units are DSL CPE units;

the packetized derived signals comprise packetized derived voice signals;

the DLC system does not have individual dedicated resources for each local packet-mode CPE unit; and the DLC system dynamically allocates, in real time, system resources for each local packet-mode CPE unit.

11. A method for processing signals in a multi-services access system for a telecommunication network, the access system capable of being coupled directly to one or more local packet-mode CPE units, a packet-switched network, and a circuit-switched network, comprising the steps of:

(a) transmitting each upstream packetized data signal received from a local packet-mode CPE unit to the packet-switched network;

(b) if a downstream packetized data signal received from the packet-switched network is destined for a local packet-mode CPE unit, then transmitting the downstream packetized data signal to the local packet-mode CPE unit;

(c) converting each upstream packetized derived signal received from either a local packet-mode CPE unit or the packet-switched network into an upstream digital stream and transmitting the upstream digital stream to the circuit-switched network;

(d) if a downstream digital stream received from the circuit-switched network is destined for a local packet-mode CPE unit, then converting the downstream digital stream into a downstream packetized derived signal and transmitting the downstream packetized derived signal to the local packet-mode CPE unit; and (e) if a downstream digital stream received from the circuit-switched network is destined for a remote packet-mode CPE unit, then converting the downstream digital stream into a downstream packetized derived signal and transmitting the downstream packetized derived signal to the packet-switched network for routing to the remote packet-mode CPE unit;

wherein the access system is further capable of being coupled to one or more circuit-mode CPE units and further comprising the steps of:

(f) converting each upstream circuit-mode signal received from a circuit-mode CPE unit into an upstream digital stream and transmitting the upstream digital stream to the circuit-switched network; and (g) if a downstream digital stream received from the circuit interface is destined for a circuit-mode CPE unit, then converting the downstream digital stream into a downstream circuit-mode signal and transmitting the downstream circuit-mode signal to the circuit-mode CPE unit;

wherein the access system is further capable of being coupled to one or more combined circuit/packet-mode CPE units and further comprising the steps of:

(h) separating each upstream combined circuit/packet-mode signal received from a combined circuit/packet-mode CPE unit into an upstream packetized data signal and an upstream circuit-mode signal;

(i) transmitting the upstream packetized data signal to the packet-switched network;

(j) converting the upstream circuit-mode signal into an upstream digital stream and transmitting the upstream digital stream to the circuit-switched network;

(k) if a downstream packetized data signal received from the packet-switched network is destined for a combined circuit/packet-mode CPE unit, then combining the downstream packetized data signal with any corresponding downstream circuit-mode signal and transmitting the resulting downstream combined circuit/packet-mode signal to the combined circuit/packet-mode CPE unit; and (l) if a downstream digital stream received from the circuit-switched network is destined for a combined circuit/packet-mode CPE unit, then converting the downstream digital stream into a downstream circuit-mode signal, combining the downstream circuit-mode signal with any corresponding downstream packetized data signal, and transmitting the resulting downstream combined circuit/packet-mode signal to the combined circuit/packet-mode CPE unit.

12. The method of claim 11, wherein the access system does not have individual dedicated resources for each local packet-mode CPE unit.

13. The method of claim 11, wherein the access system dynamically allocates, in real time, system resources for each local packet-mode CPE unit.

14. The method of claim 11, wherein:

the multi-services access system is a multi-services digital loop carrier (DLC) system;

the one or more circuit-mode CPE units are telephones;

the one or more local and remote packet-mode CPE units and the one or more combined circuit/packet CPE units are DSL CPE units;

the packetized derived signals comprise packetized derived voice signals;

the DLC system does not have individual dedicated resources for each local packet-mode CPE unit; and the DLC system dynamically allocates, in real time, system resources for each local packet-mode CPE unit.

15. The multi-services access system of claim 1, wherein both the packet-mode card and the packet interface are capable of distinguishing packetized data signals from packetized derived voice signals.

* * * * *